Patented June 17, 1947

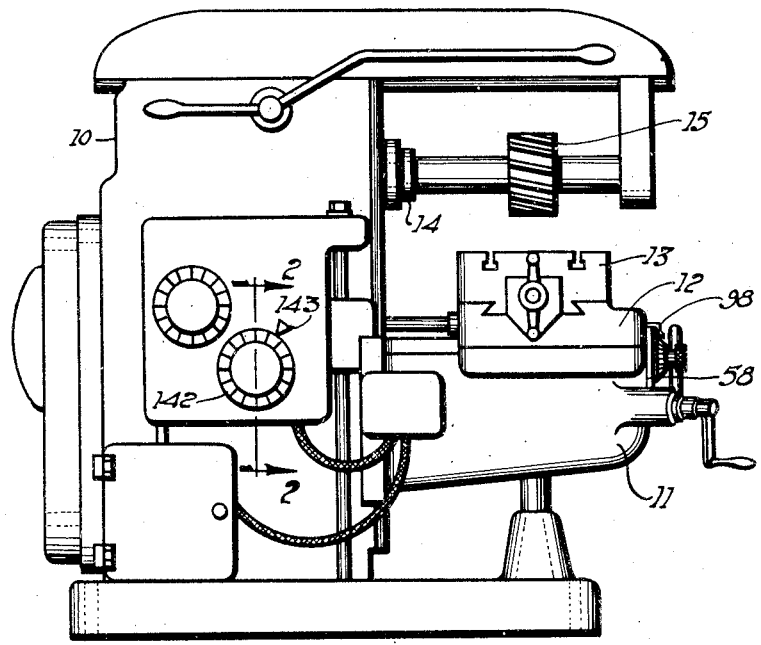
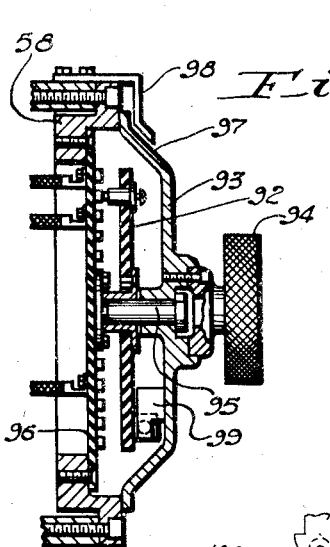
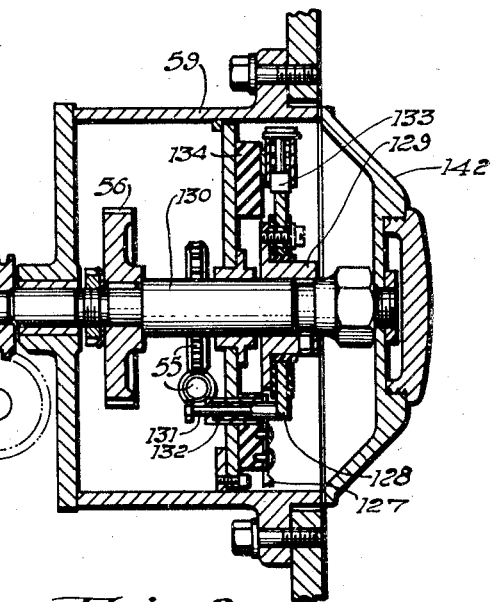
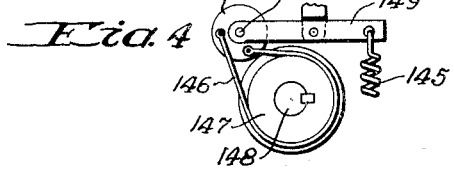

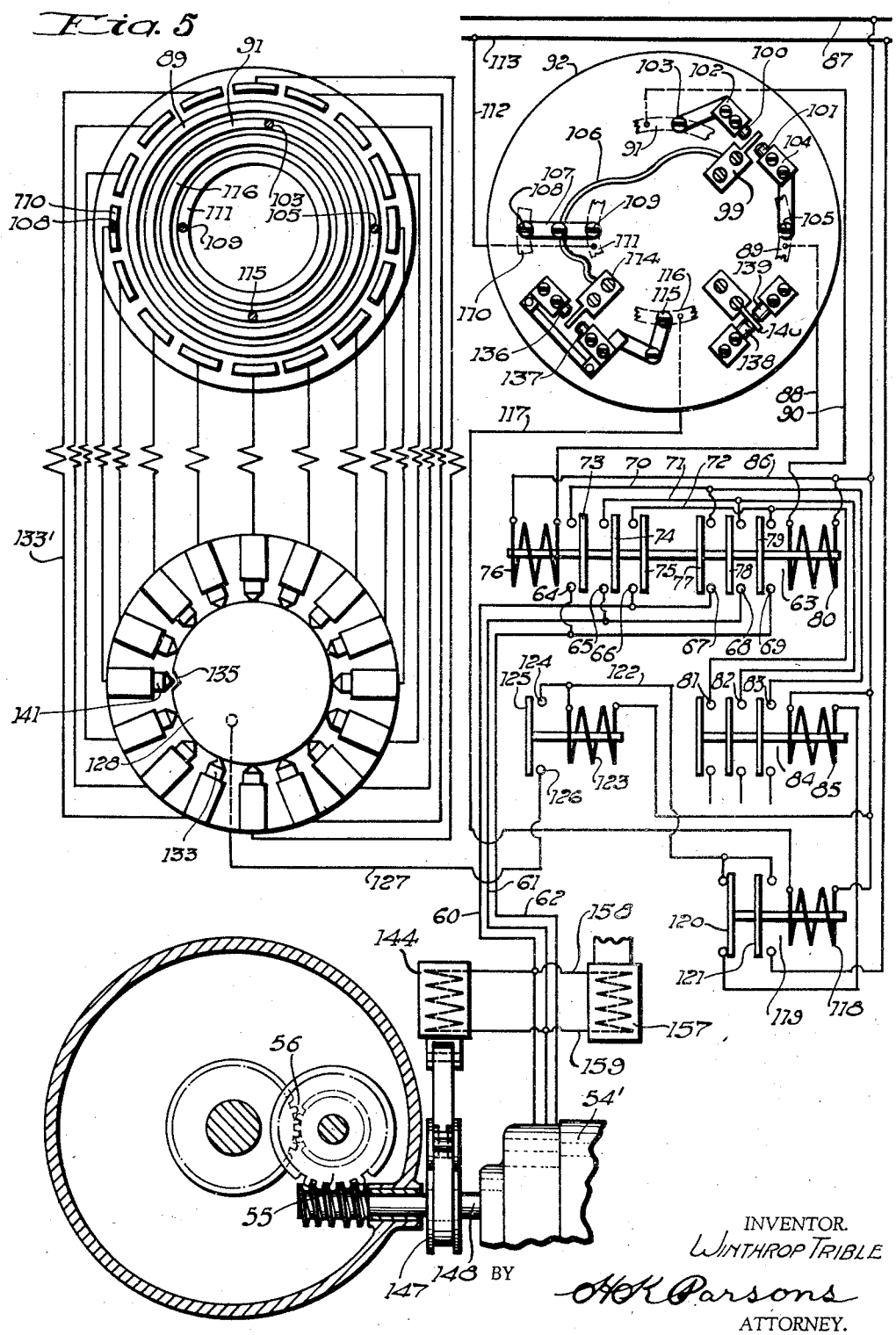

2,422,448

UNITED STATES PATENT OFFICE 2,422,448

REMOTE-CONTROL MEANS FOR SPEED CHANGE MECHANISMS

Winthrop Trible, Cincinnati, Ohio, assignor to The Cincinnati Milling Machine Co., Cincinnati, Ohio, a corporation of Ohio Application November 7, 1941, Serial No. 418,242

10 Claims. (Cl. 172—239)

This invention relates to machine tool transmissions and more particularly to improved control mechanism therefor.

One of the objects of this invention is to provide improved control mechanism for a power operable speed change mechanism of a machine tool.

Another object of this invention is to provide improved means whereby a power operable speed change mechanism of a machine tool or the like may be remotely controlled from any convenient operating station of the machine.

A further object of this invention is to provide an improved electrical control mechanism for a power operable speed change mechanism of a machine tool or the like whereby the speed of the transmission may be increased or decreased from a remote control station and means for indicating the speed selected.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is an enlarged section on the line 2—2 of Figure 1.

Figure 3 is an enlarged section through the transmitter element.

Figure 4 is a detail view of the brake mechanism.

Figure 5 is a diagrammatic view of the electrical control mechanism for remotely controlling the speed of the transmission.

In certain machine tools the operator's normal station at the machine is remotely located with respect to the main structure which houses the transmission gearing and in cases where the transmission involves a change speed mechanism, it has been necessary in the prior art for the operator to leave his operating station in order to operate the mechanism when changes in the rate of operation of certain functions of the machine are desired. In cases where power operated change speed mechanisms are employed resort has been had to mechanical linkages and sliding members to bring the control to the operator's station. But such parts complicate the construction of the machine, increase its cost and otherwise occupy valuable space which tend to clutter the machine.

This invention deals with an electrical control mechanism which has an operating or receiver unit for driving the speed change mechanism and a remote control transmitter unit which may be suitably positioned at any desirable operating station and which may be connected to the receiving unit by a simple flexible cable.

In Figure 1 of the drawings there is shown a machine tool to which this invention is particularly adaptable, the machine depicted being a milling machine having a main structure or column 10 which houses the variable speed transmission for the spindle; a knee 11 which is vertically adjustable on the column; a saddle 12 which is horizontally adjustable on the knee toward and from the column, and a table 13 which is adapted to be shifted transversely of the saddle and a cutter spindle 14 upon which is mounted a cutter 15.

The mechanism of this invention is designed to remotely control the driving of a selector valve, which is provided in the machine for determining the speed of rotation of the spindle, from any given station thereof to any desired station and in either a clockwise or counterclockwise direction, whichever is the shorter angular movement necessary to reach the desired station.

The selector valve has a drive shaft 54 which is driven by a prime mover in the form of an electric motor 54' shown in Figure 5, through a worm and worm gear reduction unit 55, intermeshing spur gears 56, and intermeshing helical gears 57, one of the latter gears being attached to shaft 54, Figure 2. The motor control means includes a transmitter unit indicated generally by the reference numeral 58 in Figures 1 and 3 of the drawings and a receiver unit indicated generally by the reference numeral 59 in Figure 2 of the drawings.

Assuming the motor to be a three phase motor it is connected by three conductors 60, 61 and 62 to a reversing switch indicated generally by the reference numeral 63 in Figure 6. The conductors terminate in a first set of contacts 64, 65 and 66 which when connected to the power mains produce one direction of rotation, and a second set of contacts 67, 68 and 69 which will produce the opposite direction of rotation.

The contacts 64, 65 and 66 are connected to the power mains 70, 71 and 72 by contactors 73, 74 and 75 which are actuable upon energization of solenoid 76, while the contacts 67, 68 and 69 are connected in the reverse order to lines 70, 71 and 72 by contactors 77, 78 and 79 upon energization of solenoid 80. Energization of solenoid 80 disconnects contactors 73, 74 and 75 while effecting connection of contactors 77, 78 and 79, while energization of solenoid 76 effects disengagement of contactors 77, 78 and 79, and engagement of contacts 73, 74 and 75.

The lines 70, 71 and 72 terminate in contacts 81, 82, and 83 of a starting switch, indicated generally by the reference numeral 84, and actuable by a solenoid 85. The reversing solenoids 76 and 80 have one side connected to a common line 86 which is directly connected to a power main 87. The other end of solenoid 76 is connected by a line 88 to a collector ring 89 of the transmitter element 58. The other end of solenoid 80 is connected by a line 90 to a collector ring 91.

The transmitter unit has a rotatable disc 92, Figure 3, composed of insulation which is mounted coaxially with a rotatable dial 93 also composed of insulating material and having a knurled operating knob 94. These parts are supported for independent rotation on a shaft 95 projecting from the fixed support member 96 upon which the collector rings 89 and 91 are mounted. The dial 93 has a beveled surface 97 which is divided into a number of equal spaces upon which is imprinted the speeds corresponding to the speeds obtainable with the selector valve. A fixed pointer 98 is provided to cooperate with the spaces to indicate the speed obtainable for each setting of the dial.

When the dial is rotated by the knob 94 a contact element 99 carried by the dial engages one of two spring plungers 100, 101 which are supported on the disc 92 to cause rotation of the disc with the dial. The plunger 100 is mounted in a housing 102 which is electrically connected to a vertical spring plunger 103 which rides on the collector ring 91. Similarly, the plunger 101 is mounted in a housing 104 which also carries a spring plunger 105 that rides on the collector ring 89.

The contactor 99 is electrically connected by a wire 106 to a plate 107 in which is mounted two spring plungers 108 and 109. The plunger 108 is adapted to successively engage the switch segments 110, while the plunger 109 rides on the collector ring 111. The collector ring 111 is permanently connected by a line 112 to a power main 113. It should now be apparent that the contactor 99 carried by the dial 97 is electrically connected to the power main 113 through the wire 106, plate 107, plunger 109 and ring 111. Thus, when the dial is rotated in a clockwise direction as viewed in Figure 5, a circuit is completed through plunger 101 and line 88 to solenoid 76, positioning the reversing switch for one direction of rotation of the motor 54; and when rotated in a counterclockwise direction a circuit is closed through plunger 100 and line 90 to solenoid 80, positioning the reversing switch to effect the opposite direction of rotation of the motor 54.

The disc 92 also carries a contact 114 which, regardless of its direction of rotation, will effect an electrical connection between line 106 and a spring plunger 115 which is adapted to ride on a collector ring 116. This collector ring is connected by a line 117 to a solenoid 118 of a delay relay 119. The other end of this relay is directly connected to the line 87. This relay carries two contactors 120 and 121. The relay is normally in the position shown in Figure 5 in which the contactor 120 closes a circuit between one end of the starting switch coil 85 and a line 122 which is connected with one end of a holding relay coil 123 and also a contact 124 of the same relay.

The other end of the relay coil 123 is permanently connected to the main line 87. Thus, when the coil 118 is energized, it closes a circuit, energizing relay coil 123 whereby a contactor 125 operated by the relay closes a circuit between contactors 124 and 126. The contact 126 is connected by line 127 to a metallic disc 128 located in the receiver unit. This disc is supported on but insulated from a hub 129 which is fixed on a rotatable shaft 130 driven by the gearing 55 from the motor 54' as more particularly shown in Figure 2. The line 127 is electrically connected to a plunger 131 which is held against the face of the disc 128 by a spring 132.

A series of spring pressed plungers 133 are arranged around the periphery of the disc 128 and the plungers are mounted on an insulating ring 134 whereby each plunger is an electrically separate unit. As shown in Figure 5 the plungers 133 are individually connected by separate wires 133' to corresponding segments 110 of the transmitter unit.

Since the plunger 108 can only engage one segment 110 at a time it will be apparent that only one of the plungers 133 will carry current at any given time. The disc 128 is provided with a single notch 135 which is sufficiently deep that a plunger riding over the notch will momentarily become electrically disconnected from the disc 128 and thereby break the circuit from the power main 113 to the line 127 and thereby to the relay coil 123 which has its other end connected to the power main 87. The function of the delay coil 118 is to disconnect the starting switch coil 85 from the contact 124 during manual rotation of the transmitter unit and then after the transmitter has stopped to effect closing of the starting switch whereby the motor will rotate until the particular plunger 133 is opposite the notch 135 which will break the circuit on the holding relay 123 and the starting switch coil 85. Since the holding relay will thus release the contactor 125, any overrun of the disc 128 making contact with the other side of the plunger 133 will be ineffective to reestablish the circuit.

Attention is invited to the fact that there is a predetermined amount of lost motion between the transmitter dial 93 and its associated disc 92 so that the contact 99 is normally disconnected from plungers 100 and 101, and contact 114 is disconnected from plungers 136 and 137. The parts are held in this position by a pair of opposed spring pressed plungers 138 and 139 carried by the disc 92 which acts on opposite sides of a lug 140 carried by the dial 93.

Thus, when the dial is rotated sufficiently to take up the lost motion and before it has moved the disc 92, it has caused a selection of the direction of motor rotation, and operation of delay relay 119 to delay operation of the motor until the desired speed rate selection has been made. The delay relay has in turn energized the holding relay, thus closing that portion of the motor circuit which extends from the disc 128 to the delay relay. Again the circuit is complete from the power main 113 to the plunger 141 but is broken by the V-notch 135.

Thus, the motor will not rotate until the selector disc 92 has been rotated to some new position selecting a new one of the parallel circuits 133' which terminates in a plunger that does contact the disc 128 whereby the circuit is complete from power main 113 to the delay relay 119 so that as soon as the delay relay is released the motor will start operation. It will continue operation until the notch 135 arrives opposite the particular plunger 141 which is carrying current to the motor and thereby breaks the circuit. Thus the motor is automatically stopped.

The motor driven shaft 130 not only drives the disc 128 and the selector valve but also a rate indicating dial 142 shown in Figures 1 and 2 which carries rate indicia similar to the transmitter dial 58, and a fixed marker 143 mounted on the machine indicates the setting of the selector valve. It will thus be obvious that when the two rate dials have the same reading, the control system is ineffective, but when they are relatively adjusted to give different readings, the system becomes effective to drive the receiver dial into correspondence with the transmitter dial.

In order to insure against overrunning of the motor, an electromagnetic brake is provided comprising a solenoid 144 which is connected as shown in Figure 5 directly to the motor lines 60 and 61. A spring 145, Figure 4, normally applies a braking pressure to the brake band 146 which surrounds a brake drum 147 secured to the motor shaft 148 through a lever 149 and toggle wheel 150 to which the ends of the band 146 are attached. The lever is attached to the wheel and both rotate about the fixed shaft 151. The armature 152 of the solenoid 144 is connected to the lever through a link 153. When the motor is running the solenoid is energized to release the brake but whenever the circuit to the motor is broken the brake is immediately and automatically applied.

There has thus been provided an improved remote control mechanism for a power operable gear shift mechanism in which the remote control unit including the dial 58 may be remotely located with respect to the transmission such as on the front of knee 11 of a knee and column type milling machine as shown in Figure 1 of the drawings. It will be obvious that any other convenient operating station may be chosen because the connecting cable may be arranged simply without interfering with the operating structure of the machine.

What is claimed is:

1. In a control circuit for a motor coupled for driving a part from any one of a plurality of positions to any other thereof, the combination with a motor, of a motor starting switch relay, a remote control transmitter, a plurality of parallel circuits corresponding in number to the number of positions of said part, means for adjusting said transmitter for selectively energizing one of said circuits, a terminal switch member providing contact with all of said circuits except one whereby a given circuit will be open for a predetermined position of said member, a common circuit connecting said switch member to the starting relay, means connecting the motor for synchronously driving the switch member and said part until the switch member opens the selected circuit, a normally closed switch in said common circuit, and means energizable by the transmitter during adjustment thereof to open said switch.

2. In a control circuit for a motor coupled for driving a part from any one of a plurality of positions to any other thereof, the combination with a motor, of a remote control transmitter selectively positionable to a number of positions corresponding to the number of positions of said part, a pair of direction control relays for the motor, independent circuits from the transmitter to the respective relays for selective energization by the transmitter, a starting relay for the motor, a selective circuit means controlled by the transmitter from its various positions for energizing the starting relay to drive the motor, means driven by the motor to open said selective circuit means, a normally closed switch connecting the selective circuit to the starting relay, and an independent circuit from the transmitter having means energizable by the transmitter for opening said closed switch temporarily during selective positioning of the transmitter.

3. In a control circuit for a motor coupled for driving a part from any one of a plurality of positions to any other thereof, the combination with a motor, of a remote control transmitter adjustable in either direction to a plurality of positions corresponding in number to the positions of said part, a pair of direction control relays, independent circuits to the respective relays selectively energizable by the transmitter in accordance with its direction of adjustment, a motor starting relay, a selective circuit including a plurality of parallel branches terminating in the transmitter for selective energization upon adjustment thereof, a common circuit connecting said branches to the starting relay and including a normally open switch and a serially connected normally closed switch, an independent circuit energizable by the transmitter during adjustment thereof and containing means for opening said closed switch and effecting closing of said normally opened switch, a holding circuit established by the last-named switch for maintaining it closed whereby upon reclosing of the normally closed switch a circuit will be completed to the starting relay to cause operation of the motor, and means driven by the motor for opening said common circuit upon positioning of said part in correspondence to the transmitter.

4. In a control circuit for a motor coupled for driving a part from any one of a plurality of positions to any other thereof, the combination with a motor, of a remote control transmitter adjustable in opposite directions to a plurality of positions corresponding in number to the positions of said part, a pair of direction control relays for said motor, independent circuits to the respective relays selectively energizable by the transmitter in accordance with the direction of adjustment of said transmitter, a starting relay, a selective circuit having a plurality of parallel branches terminating in the transmitter, means to adjust the transmitter for selective energization of said branch circuits, a connecting circuit including a terminal switch member having means simultaneously connected to all of said branch circuits except one, a normally closed switch and a normally opened switch serially arranged in said connecting circuit, an additional circuit having means energizable by the transmitter for opening said closed switch and for simultaneously causing the closure of said normally opened switch, a holding circuit established by the closing of said normally opened switch to hold it closed, means in the transmitter for opening said additional circuit upon completion of adjustment of said transmitter for reclosing said normally closed switch and establishing a circuit to the starting relay, means coupling said switch member and said part for synchronous rotation by the motor whereby the switch member will be driven into a position to break the selected circuit and determine the position of said part.

5. In a control circuit for a motor coupled for driving a part from any one of a plurality of positions to any other thereof, the combination with the motor of a reversing switch, directional controlled relays for positioning the switch, an adjustable remote control transmitter including a disc and a dial, a lost motion connection between said disc and dial, a pair of contacts carried by the disc and connected to the respective relays, an energized contact carried by the dial and movable, upon takeup of the lost motion, into selective engagement with the first-named contacts to selectively energize said relays to determine the direction of rotation of the motor, and simultaneously cause rotation of the disc upon further movement of the dial to one of a plurality of selective positions to cause actuation of the motor, a plurality of parallel circuits extending from said selective positions, switch means intercoupling all of said circuits except one to said reversing switch, and means coupling the motor for driving said switch means and said part to break the motor circuit upon positioning of said part in correspondence with said transmitter.

6. In a control circuit for a motor coupled for driving a part in either direction from any one of a plurality of positions to any other thereof, the combination with the motor of a motor starting switch relay and motor direction control relays, an adjustable remote control transmitter having a plurality of positions corresponding in number to the number of positions of said part and adjustable in either direction from any given position to any other thereof, independent circuits to the respective directional control relays selectively energizable by the transmitter, a plurality of selective circuits terminating in the transmitter one for each position thereof, means connecting said selective circuits to the starting relay including an interrupter relay, an independent circuit from the transmitter to the interrupter relay and energizable by the transmitter during positioning movement thereof to open the circuit to the starting relay, and means driven by the motor upon subsequent actuation thereof for opening the selected circuit and thereby stop the part in the position selected by the transmitter.

7. In a control circuit for a motor coupled for driving a part from any one of a plurality of positions to any other thereof, the combination with a motor of a remote control transmitter having a plurality of positions corresponding in number to the number of positions of said part, a plurality of parallel selective circuits connected for energization by the transmitter in accordance with the position thereof and in accordance with the desired position of said part, a motor starting relay, a holding relay having means for coupling said selective circuits to the starting relay, separate circuit connections controlled by the transmitter for energizing said holding relay, means driven by the motor for opening the selected circuit and thereby deenergizing the holding relay whereby inadvertent reclosing of the selected circuit will not reestablish actuation of the motor.

8. In a control circuit for a motor coupled for driving a part from any one of a plurality of positions to any other thereof, the combination with the motor, of a motor starting switch relay, a remote control transmitter having a plurality of positions, a plurality of parallel circuits selectively energizable by the transmitter, means connecting said parallel circuits to the starting switch relay including a pair of control relays, means operable by the transmitter for energizing one control relay, a circuit closed by said one control relay for energizing the other control relay, means responsive to operation of the last-named relay for establishing a holding circuit between said parallel circuits and said starting relay, and means responsive to operation of the motor for opening the selected circuit and thereby the holding control relay whereby inadvertent reclosing of the circuit will not reenergize the starting relay.

9. In a control circuit for a motor coupled for driving a part from any one of a plurality of positions to any other thereof, the combination with the motor of a motor starting switch relay, a pair of directional control relays for the motor having independent circuits thereto, a plurality of parallel selective circuits corresponding to the number of positions of said part, a normally closed switch connecting said parallel circuits to the starting relay, a remote control transmitter comprising co-axial parts, a lost motion connection between said parts effective for either direction of movement, one of said parts being rotatable to take up the lost motion and cause rotation of the other part, means responsive to lost motion take-up to selectively energize the circuits to the directional control relays and simultaneously effect opening of said normally closed switch, means responsive to rotation of said other part after lost motion take-up for selectively energizing one of said parallel circuits, and means responsive to the reestablishing of lost motion between said parts to release said normally closed switch for completing the circuit from said selected circuit to the starting switch relay to cause operation of the motor, and means driven by the motor to open the selected circuit.

10. In a control circuit for a motor coupled for driving a part in either direction from any one of a plurality of positions to any other thereof, the combination with the motor of an electrically operable brake normally held in a braking position, a motor and brake control switch relay, motor direction control relays, an adjustable remote control transmitter having a plurality of positions equal in number to the number of positions of said part and adjustable in other directions from any given position to any other position thereof, a plurality of selective circuits for the motor control relay, means in the transmitter and effective upon movement thereof to selectively energize one of said direction control relays and to selectively energize one of said selective circuits, an interrupter relay having means connecting said selective circuits to the motor control relay, means connecting the interrupter relay to the transmitter for energization thereby to open the circuit to the motor control relay until the transmitter has completed its selective movement, means responsive to release of said transmitter to cause said interrupter relay to close the circuit to said motor and release said brake, and means driven by the motor for opening the selected circuit and thereby cause application of the brake and stop the motor with the part in the position selected by the transmitter.

WINTHROP TRIBLE.

(References on following page)

REFERENCES CITED

The following references are of record in the file of this patent:

UNITED STATES PATENTS

| Number | Name | Date |
|---|---|---|
| 1,904,971 | Ernst et al. | Apr. 18, 1933 |
| 1,976,139 | Nenninger et al. | Oct. 9, 1934 |
| 2,010,556 | Nenninger et al. | Aug. 6, 1935 |
| 2,248,564 | Wood | July 8, 1941 |
| 2,073,862 | Bendix et al. | Mar. 16, 1937 |
| 2,094,777 | Ellinger | Oct. 5, 1937 |
| 2,165,226 | Collins | July 11, 1939 |
| 936,878 | Fishback | Oct. 12, 1909 |
| 2,145,895 | Samuelson | Feb. 7, 1939 |
| 1,839,993 | Pew | Jan. 5, 1932 |
| 2,243,845 | Goit et al. | June 3, 1941 |
| 1,893,644 | Fleischel | Jan. 10, 1933 |
| 1,993,544 | Fleischel | Mar. 5, 1935 |
| 347,517 | Steinback | May 18, 1943 |
| 1,118,929 | Fynn | Dec. 1, 1914 |
| 2,085,442 | Newell | June 29, 1937 |
| 2,267,135 | Roberts | Dec. 23, 1941 |
| 902,554 | Brown | Nov. 3, 1908 |
| 2,113,348 | Hutchinson | Apr. 5, 1938 |
| 2,044,607 | Garrett | June 16, 1936 |
| 1,408,611 | Larner | Mar. 7, 1922 |
| 2,315,389 | Benson | Mar. 30, 1943 |
| 1,173,764 | Baldwin | Feb. 29, 1916 |

FOREIGN PATENTS

| Number | Country | Date |
|---|---|---|
| 371,127 | Great Britain | Apr. 21, 1932 |
| 14,415 | Great Britain | 1908 |
| 359,824 | Great Britain | Oct. 29, 1931 |